(12) United States Patent
Pond et al.

(10) Patent No.: US 9,672,632 B2
(45) Date of Patent: Jun. 6, 2017

(54) DEVICE AND METHOD FOR CAMERA DRIVEN BACKGROUND SUBTRACTION

(71) Applicant: Disney Enterprises, Inc., Burbank, CA (US)

(72) Inventors: Christopher Pond, Burbank, CA (US); Smadar Gefen, Burbank, CA (US); David Casamona, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 0 days.

(21) Appl. No.: 14/918,993

(22) Filed: Oct. 21, 2015

(65) Prior Publication Data

US 2017/0116750 A1 Apr. 27, 2017

(51) Int. Cl.
*G06K 9/34* (2006.01)
*G06T 7/20* (2017.01)
*G06T 7/00* (2017.01)

(52) U.S. Cl.
CPC ............ *G06T 7/2006* (2013.01); *G06T 7/004* (2013.01); *G06T 7/0081* (2013.01); *G06T 7/0089* (2013.01); *G06T 2207/20144* (2013.01)

(58) Field of Classification Search
CPC ..... G06T 7/004; G06T 7/0042; G06T 7/0044; G06T 7/0046; G06T 7/0048; G06T 7/0065; G06T 7/0071; G06T 7/0081; G06T 7/0089; G06T 7/20; G06T 7/2006; G06T 2207/10004; G06T 2207/10016; G06T 2207/10021; G06T 2207/30221; G06T 2207/30236; G06T 2207/30242; G06K 9/00711; G06K 9/00718; G06K 9/00724; G06K 9/00744; G06K 9/00751; G06K 9/00758; G06K 9/00765; G06K 9/00771; G06K 9/00778; G06K 9/00785; H04N 1/00251; H04N 1/2187; H04N 5/232; H04N 5/23229; H04N 5/23245; H04N 5/23251; H04N 5/272
See application file for complete search history.

(56) References Cited

U.S. PATENT DOCUMENTS

| 9,041,826 | B2* | 5/2015 | Jung | H04N 1/00251 348/220.1 |
| 9,094,615 | B2* | 7/2015 | Aman | G01S 3/7864 |
| 2009/0257662 | A1* | 10/2009 | Rudin | G06K 9/00771 382/218 |

OTHER PUBLICATIONS

Bouwmans, "Recent Advanced Statistical Background Modeling for Foreground Detection—A Systematic Survey", Laboratoire MIA, Universitéde La Rochelle, La Rochelle, France, 2011, 31 sheets.

(Continued)

*Primary Examiner* — Jose Couso
(74) *Attorney, Agent, or Firm* — Fay Kaplun & Marcin, LLP (57) ABSTRACT

A device, system, and method performs a camera driven background subtraction. The method being performed at an electronic device includes receiving information corresponding to an image-capturing device that is capturing an image. The method includes automatically selecting one of a plurality of image analysis mechanisms based upon the information. The method includes receiving the captured image captured by the image-capturing device. The method includes performing an image analysis using the selected image analysis mechanism on the captured image to determine a foreground and a background in the captured image.

18 Claims, 2 Drawing Sheets

(56) References Cited

OTHER PUBLICATIONS

Parks et al., "Evaluation of Background Subtraction Algorithms with Post-processing", University of British Columbia, Vancouver, Canada, IEEE, 2008, pp. 192-199.

Cheung et al., "Robust techniques for background subtraction in urban traffic video", Center for Applied Scientific Computing Lawrence Livermore National Laboratory, Livermore, CA, US, 2007, 12 sheets.

Brutzer et al., "Evaluation of Background Subtraction Techniques for Video Surveillance", Intelligent Systems Group, Universitat Stuttgart, Germany, IEEE, 2011, pp. 1937-1944.

Benezeth et al., "Review and Evaluation of Commonly-Implemented Background Subtraction Algorithms*", IEEE, 2008, 4 sheets.

Bayona et al., "Comparative evaluation of stationary foreground object detection algorithms based on background subtraction techniques", Escuela Politécnica Superior, Universidad Autónoma de Madrid, Spain, IEEE, 2009, pp. 25-30.

Fang et al., "A Moving Object Detection Algorithm Based on Color Information", IOP Publishing Ltd, Journal of Physics: Conference Series 48 (2006), 2009, pp. 384-387.

* cited by examiner

DEVICE AND METHOD FOR CAMERA DRIVEN BACKGROUND SUBTRACTION

BACKGROUND INFORMATION

A video may be a presentation of a plurality of images shown in sequence over a period of time. The video may be used as a basis for broadcasting a variety of events. For example, the events may be live events such as sporting events (e.g., baseball, football, basketball, soccer, hockey, etc.), concert events, etc. or pre-recorded events such as broadcast programs or shows. While broadcasting the video of the event, the images may be processed for a variety of reasons. For example, the video may be shown with enhancements or include further features within the images of the video. In a specific enhancement, during a broadcast of a football game, a first-down line feature may be used in which a fluorescent yellow line appears on the field. To properly provide these enhancements or further features, the images may be processed to determine background components and foreground components, when applicable. For example, in a sporting event, the background component may be a stadium or field while the foreground components may include the athletes. Accordingly, the first-down line feature may be properly superimposed over only the background components of the image so that it does not occlude or block the foreground components.

There are different manners for the foreground components to be differentiated from the background components within an image. That is, there are a variety of mechanisms that may be used to determine objects in the foreground and remaining portions that comprise the background. One consideration behind using the different mechanisms is whether an image-capturing device (e.g., camera) is moving. Some background/foreground differentiation mechanisms were designed with this consideration as a basis.

In a first example of an image analysis mechanism, a background modeling based method may be used in which a training image sequence is studied to determine what is background, typically resulting in a reference image representative of the background. A subsequent image may include a foreground object that may be determined based upon the reference background image. This type of background modeling based method may be considered an inter-frame processing method. The background modeling based method is often associated and more efficient with images that are captured with a static image-capturing device (e.g. stationary camera). In view of the reference images, those skilled in the art will understand that when the image-capturing device is in motion, there are potentially significant further processing requirements to perform the background/foreground functionality. When a broadcast is shown live such as a sporting event, the background/foreground functionality must be performed within an acceptable time. Even when the image-capturing device is static, there may be other inadvertent errors that may occur such as a ghosting effect.

In a second example of an image analysis mechanism, a feature-based segmentation method may be used in which an image-by-image analysis is performed to determine what comprises the background and foreground. This type of background analysis where each image is analyzed may be considered an intra-frame processing method. The feature-based segmentation method is often associated with images that are captured with a moving image-capturing device. When intra-frame processing is used, those skilled in the art will understand that when the image-capturing device is static, there may be significant unnecessary processing steps that are performed when using this type of background processing mechanism. Again, when a broadcast is shown live, the background/foreground functionality must be performed within an acceptable time.

Therefore, although there are different manners of performing image processing to determine the foreground and background within an image, there are limitations and drawbacks associated with all these manners.

DETAILED DESCRIPTION

The exemplary embodiments may be further understood with reference to the following description and the related appended drawings, wherein like elements are provided with the same reference numerals. The exemplary embodiments are related to a device and method for dynamically selecting a mechanism for an image analysis to determine foreground from background in a captured image. Specifically, the exemplary embodiments may determine image-capturing parameters to further determine a type of image analysis mechanism to be used. The exemplary embodiments may further be configured to utilize multiple image analysis mechanisms in which a feedback loop is created between the multiple image analysis mechanisms. Thus, the exemplary embodiments provide an improved image processing procedure with a higher confidence in identifying a foreground from a background in a captured image.

Figure 1:
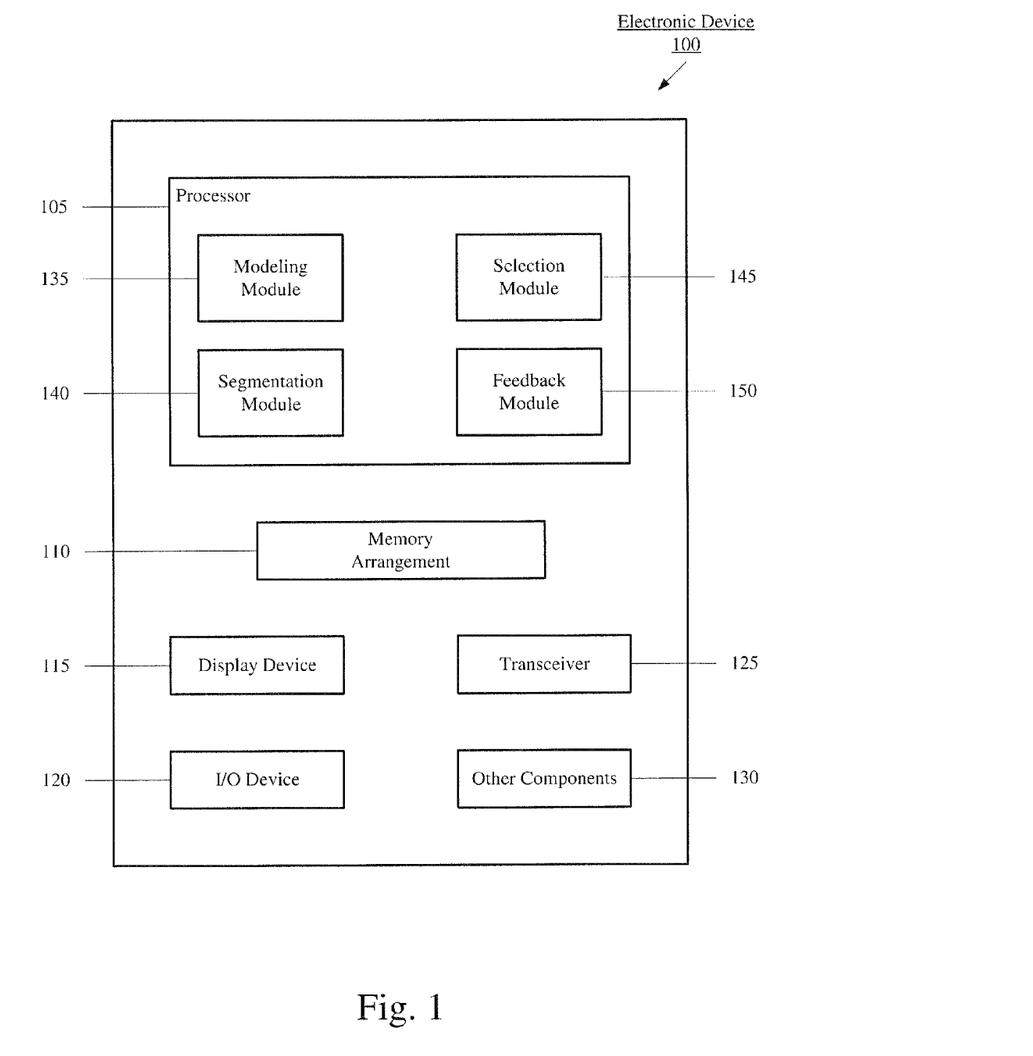
FIG. 1 shows an electronic device according to the exemplary embodiments.

FIG. 1 shows an electronic device 100 according to the exemplary embodiments. The electronic device 100 may be any component within an image-capturing, processing, and broadcasting system. Specifically, the electronic device 100 may be configured with the image processing aspect of the system. For example, the electronic device 100 may be a server or a network component that is communicatively connected to further devices that perform the image-capturing aspect of the system such as cameras. However, it should be noted that the electronic device 100 performing the image processing aspect and different devices performing the image-capturing aspect is only exemplary. That is, in another exemplary embodiment, the electronic device 100 may be configured to perform all functionalities ranging from capturing the images, processing the images, and transmitting (e.g., broadcasting) the images. For illustrative purposes only, the electronic device 100 is described herein as performing the image processing aspect only. The electronic device 100 may include a processor 105, a memory arrangement 110, a display device 115, an input/output (I/O) device 120, a transceiver 125, and other components 130 (e.g., a battery, a data acquisition device, ports to electrically connect the electronic device 100 to other electronic devices, etc.).

The processor 105 may be configured to execute a plurality of applications of the electronic device 100. As will be described in further detail below, the processor 105 may execute the applications through a modeling module 135, a segmentation module 140, a selection module 145, and a feedback module 150. The modeling module 135 may be configured to perform a first type of image analysis mechanism (e.g., image subtraction method) to determine a foreground from a background in a captured image. The segmentation module 140 may be configured to perform a second type of image analysis mechanism to determine the foreground from the background in the captured image. The selection module 145 may be configured to select which of the first and second image analysis mechanisms to use as a primary mechanism in determining the background and the foreground in the captured image. The feedback module 150 may be configured to incorporate analysis from the first image analysis mechanism into the second image analysis mechanisms, and vice versa. The feedback module 150 allows a selected image analysis mechanism to be a primary mechanism and other image analysis mechanisms to be secondary mechanisms.

It should be noted that the above noted applications, each being an application (e.g., a program) executed by the processor 105, is only exemplary. The functionality associated with the applications may also be represented as a separate incorporated component of the electronic device 100 or may be a modular component coupled to the electronic device 100, e.g., an integrated circuit with or without firmware.

The memory arrangement 110 may be a hardware component configured to store data related to operations performed by the electronic device 100. Specifically, the memory arrangement 110 may store a captured image as well as any data that is provided therewith and data determined through processing of the captured image. The display device 115 may be a hardware component configured to show data to a user while the I/O device 120 may be a hardware component that enables the user to enter inputs. It should be noted that the display device 115 and the I/O device 120 may be separate components or integrated together such as a touchscreen. As will be described in further detail below, the display device 115 may enable a user to view the captured image and utilize the I/O device 120 to provide initial inputs used by the modeling module 135 or the segmentation module 140 in determining background and foreground in the captured image. The transceiver 125 may be a hardware component configured to transmit or receive data in a wired or wireless manner. Specifically, the transceiver 125 enables the captured image to be received from an image-capturing device. More particularly, the transceiver 125 enables video comprising a series of consecutive images that is captured by the image-capturing device to be received.

As described above, the processor 105 may execute a plurality of functionalities via the modeling module 135, the segmentation module 140, the selection module 145, and the feedback module 150. According to the exemplary embodiments, the electronic device 100 may perform an image analysis procedure on a captured image that is received from any image-capturing device via the modeling module 135 or the segmentation module 140. Accordingly, a first aspect of the exemplary embodiments is the manner in which the image processing is performed. The electronic device 100 of the exemplary embodiments may perform further aspects on the image analysis procedure that optimizes a determination of foreground and background within the captured image via the selection module 145 or the feedback module 150. Accordingly, a second aspect of the exemplary embodiments is the manner in which the image analysis mechanisms are utilized in the image analysis procedure.

In the first aspect, the exemplary embodiments may utilize one or more image analysis mechanisms. In a specific exemplary embodiment, the image analysis mechanisms may be based upon parameters in which the images are captured by image-capturing devices such as whether the image-capturing devices are static or moving. It should be noted that the description herein relating to the parameters for the image-capturing devices is only exemplary. The exemplary embodiments may further be configured for utilizing image analysis mechanisms on a different basis such as length of time for analysis, local conditions (e.g., movement of lighting conditions through video), environmental considerations (e.g., weather conditions), etc. For illustrative purposes, the exemplary embodiments herein are described such that a first image analysis mechanism is a background modeling mechanism and a second image analysis mechanism is a feature-based segmentation mechanism. It should be noted that the use and selection between two types of image analysis mechanisms is only exemplary and the selection may be between multiple types (or multiple implementations of the same type) of image analysis mechanisms.

The background modeling mechanism and the feature-based segmentation mechanism may be types of background subtraction methods aimed at extracting foreground regions from images comprising a video. This may be performed by determining the background image regions that generally originate from static portions of the scene captured in the image. However, in view of many factors that complicate the process of background subtraction such as camera movements (both intentional and unintentional), changing lighting conditions, static foregrounds or dynamic backgrounds, lack of discriminating features among background and foreground regions, etc., different image analysis mechanisms have been devised and used.

The modeling module 135 of the processor 105 of the electronic device 100 may perform the first image analysis mechanism of background modeling. Specifically, the electronic device 100 may first receive a captured image via the transceiver 125 to perform the background modeling mechanism for image analysis. The background-modeling mechanism may be based upon utilizing a reference image. In this type of analysis, the background-modeling mechanism may learn the reference image (i.e., a background model) that includes only the scene or only background components without any foreground components. During runtime, each image of the video (i.e., frame of the video) may be compared with the reference image to determine the portions of the image that belong to the background and the portions of the image that belong to the foreground. This comparison may yield a binary mask in which each pixel of the image may be given a value of "1" which is indicative of the foreground or a value of "0" which is indicative of the background (or vice versa). The binary mask may therefore be used by other processes in the system where knowledge about the different components of the scene is required.

Each of the pixels from the reference image may represent an image projection of a three-dimensional point in the scene captured in the image. Each of the pixels may also have a statistical model associated therewith. The statistical model may be a probabilistic distribution of the pixel appearance over time such as color. The statistical model of the pixel in the reference image may be generated during a training phase. For example, this training phase may be performed prior to any image processing in foreground and background determination of captured images. To account for changing conditions during runtime, the electronic device 100 may include a feature in which the statistical model may be updated continuously.

Therefore, the background modeling mechanism integrates information over time to learn the statistics of each pixel in the image such as the reference image. Those skilled in the art will understand that this approach is more effectively suited to a static image-capturing device where the values of a specific pixel that is sampled across time represents a projection of the same point at the scene. In cases where the camera is dynamic, an additional step may be required under the background modeling mechanism to compensate for camera motion by aligning (e.g., registering) images of succeeding frames. For example, a new reference image or a new training period may be required for frames in different scenes. However, overlapping areas may provide preliminary information for these subsequent images/training periods.

The background modeling mechanism may utilize a variety of different specific approaches to accomplish the background and foreground determination process. For example, the approaches may include a video surveillance procedure, an optical motion capture procedure, a multimedia procedure, etc. to determine the reference image which is subsequently used to determine moving objects or possible foreground objects in a captured image. In a first manner, the reference image may simply be taken while no foreground objects are present. In a second manner, the reference image may be taken or determined in various procedures such as a background modeling procedure, a statistical background modeling procedure (such as that described above), a fuzzy background modeling procedure, a background clustering procedure, a neural network background modeling procedure, a wavelet background modeling procedure, a background estimation procedure, etc.

Each of these procedures has respective advantages and disadvantages and incorporates various methods of generating the reference image to be used in the background modeling mechanism. In a substantially similar manner as the background modeling mechanism being generally more effective when using static image-capturing devices, the procedures for generating the reference image may also be used based upon a variety of factors surrounding the image analysis scenario. For example, each of the procedures may incorporate situational awareness including light source, noise image, camera jitter, automatic adjustments, time of day, etc. Among these factors, two particular difficulties in the reference image procedures may be dynamic backgrounds such as scenes including camera jitter, waving trees, water rippling, water surfaces, etc. and illumination changes such as scenes including lights being on and off. Based upon these factors, one or more of the reference image procedures may be more effective than others, for example, to minimize false detections in generating a mask of the background. The procedures may also utilize updating features that dynamically account for changes in conditions such as lighting as a light source may move over a period of time while the image-capturing device remains static. Thus, the reference image may be updated over time as well.

In utilizing the different approaches to reference image procedures, various thresholds or other criteria may be considered in evaluating the robustness of the procedure. For example, in a real-time application running on the electronic device 100, the constraints to be considered may be a minimum amount of computation time as well as the use of a minimum amount of memory. Accordingly, the exemplary embodiments may measure an optimal manner of performing this portion of the background modeling mechanism. Therefore, the exemplary embodiments may utilize any of these types of reference image procedures as a portion of the background modeling mechanism performed by the modeling module 135.

In a further refinement, the exemplary embodiments may incorporate additional features in generating a reference image, particularly using a training video sequence. Specifically, while processing a plurality of captured images, the modeling module 135 may ascertain a most probable color value for each image pixel that collectively create the reference image. This feature may utilize a background averaging approach. This approach may particularly be useful when the above noted conditions of a reference image simply being captured or a dynamic background with moving objects exists. A frequency counter may be used for each pixel such that a most frequent color value over the training video sequence may represent a highest likelihood of being a background component rather than a foreground component. The frequency counter may accordingly account for a plurality of potential color values at a specific pixel and any captured image that is analyzed may have a pixel-by-pixel analysis with respect to the reference image to determine whether the pixel belongs to the background or the foreground.

Once the reference image has been established, the background of the scene being captured by the image-capturing device may be determined and the background mask may be established for further image analysis. Therefore, any subsequent image that is captured may be analyzed with respect to the reference image. While analyzing subsequent captured images after the reference image is determined, an object that is not included in the reference image may be determined as a foreground object or a portion of a foreground mask over the scene.

The exemplary embodiments may also utilize combination approaches in which more than one procedure is performed in the background modeling mechanism to improve an overall performance. For example, a further-processing procedure may be used. As noted above, the reference image procedures may be incapable of adjusting to changing illumination conditions, ignore movement of small background elements, incorporate new objects into the reference image, etc. The further processing procedure may increase robustness to these factors. The further processing procedure may include a variety of different techniques to improve generating a foreground mask from foreground detection. For example, the further processing procedure may be a noise removal process (removing of inadvertent noise through filtering algorithms), a blob processing (filling internal holes in the image or removing insufficiently large areas), a saliency test (determining whether a foreground object may be explained by the reference image), an optical flow test (removing a ghosting effect such as when a foreground object stops moving for a given time that the foreground object is determined as background but subsequently the foreground object moves again), an object level feedback (e.g., unconditional updating where every pixel is updated or conditional updating where only pixels identified as background are updated), etc. Using these various further processing procedures, the reference image may be updated and improved.

The mask corresponding to the foreground or the background may also be validated based on information extracted from sources external to the reference image. The modeling module 135 may also request and receive (via the transceiver 125) further information beyond what is included in the captured image to update and improve the reference image for use in further image analysis. For example, information of neighboring pixels, adapting to a moving speed of a foreground object, information of non-stationary pixels corresponding to moving background objects, etc. may be external sources that enable improvements to the reference image as conventional approaches such as morphology and thresholding may not address such issues fully.

The selection of one or more the reference image procedures to be used by the modeling module 135 may also incorporate further features. For example, for each type of reference image procedure, the modeling module 135 may be configured to evaluate each procedure and determine current conditions of image capture such that a proper selection of the reference image procedure being most effective may be performed.

In addition, spatial information (e.g., color segmentation) may be combined with the background modeling mechanism for further improvements and updates to the reference image. Those skilled in the art will understand that there are a plurality of different ways for moving object detection and orientation. The modeling module 135 may utilize information from such techniques in evaluating a pixel (and its neighbors) as well as other spatial information, color segmentation, and a reference image to improve the use of the reference image. For example, a detection of an intact moving object when the foreground has low contrast with the background may improve the reference image when such a detection may have otherwise been missed (and simply determined as background instead).

The segmentation module 140 of the processor 105 of the electronic device 100 may perform the second image analysis mechanism of a feature-based segmentation. Specifically, again, the electronic device 100 may first receive a captured image via the transceiver 125 to perform the feature-based segmentation mechanism for image analysis. The feature-based segmentation mechanism may be used to distinguish between background and foreground regions in the captured image using information from each frame or captured image independently using an intra-frame processing. Therefore, the feature-based segmentation mechanism is agnostic of camera motion. The feature-based segmentation mechanism may use a variety of image features such as color, shape, edge, gradient, texture, disparity (e.g., depth), a combination thereof, etc. Prior information that characterizes the foreground and background regions may be utilized and may also be provided manually.

Generally, image segmentation may be a process in which a captured image is partitioned into a plurality of segments including at least one pixel of the captured image. The purpose of image segmentation relates to simplifying or altering the captured image into a representation that provides more useful information for image analysis. For example, image segmentation may be used to identify objects and boundaries in images. Specifically, image segmentation may be the process of distinguishing each pixel in the captured image such that pixels under a same identification share certain characteristics such as being background or foreground. As a result of performing an image segmentation mechanism, one or more collective set of pixels covering the entire captured image may be determined where each region or set of pixels are similar with respect to a common characteristic. With particular regard to feature-based segmentation, this procedure may be performed to identify objects or features within the captured image to identify the background and the foreground.

In a substantially similar manner as the background modeling mechanism, the feature-based segmentation mechanism may also utilize a variety of different manners of performing this functionality. For example, the feature-based segmentation mechanism may include procedures based upon thresholding, clustering, compressions, histograms, edges, dual clustering, region-growing, differential equations, variations, graph partitioning, etc. The different types of feature-based segmentation mechanisms may also have respective advantages and disadvantages in which each type may be more effective for certain conditions while less effective for other conditions. Therefore, the exemplary embodiments may utilize any of these types of feature-based segmentation mechanisms performed by the segmentation module 140.

A specific form of feature-based segmentation may be a chroma-key feature. The process of chroma-keying may relate to a post-production technique for compositing or layering two images or video streams together based on color hues (chroma range). The chroma-key feature may enable a selected color in a first image disposed as a top layer to be made transparent such that a second image disposed as a bottom layer is revealed. Contemporarily, the chroma-key feature may be referred to as a "green screen" (or blue depending on the selected color). For example, the first image disposed as the top layer may include an object such as a person in front of a backdrop where the backdrop has a uniform color throughout. A user may select the color of the backdrop for the transparent feature (e.g., use the I/O device 120 such as a mouse to select the color of the backdrop shown in the captured image on the display device 115 as the input). The chroma-key feature may thereby use the second image disposed as the bottom layer to become visible over any part of the first image having the selected color.

In contrast to utilizing a reference image such as the background modeling mechanism (an inter-frame process), the feature-based segmentation mechanism may be an intra-frame process whereby each frame is analyzed to determine foreground and background in a plurality of captured images of the video sequence. As such, the segmentation module 140 may also utilize a learning phase to perform the functionalities of background subtraction. Specifically, the learning phase may enable background to be identified in captured images to be analyzed. For example, as noted above, the chroma-key feature may enable a user to designate locations in a captured image (e.g., from a captured image in a locked off image-capturing device) that indicate samples of colors of pixels that are used for the chroma-key feature. Both location and color values may be sampled and stored from the indicated selections. Accordingly, subsequent captured images may be analyzed to generate a foreground mask and a background mask based upon the selected colors or locations.

The segmentation module 140 may have a further learning phase to refine the process of determining background and foreground. For example, selected types of image segmentation may be utilized in this further learning phase such as thresholding and morphology. These procedures may initially favor excluding foreground objects. Specifically, thresholding relates to replacing each pixel in the captured image with a black pixel if the intensity of the pixel is less than a predetermined constant or a white pixel if the intensity of the pixel is greater than the predetermined constant. Accordingly, a binary image may be generated based upon the thresholding procedure. Morphology relates to a technique for analyzing structures based on a variety of factors including set theory, lattice theory, topology, random functions, etc. When applied to background subtraction, morphology may enable an object or a shape thereof to be identified such that erosion and dilation processes may be performed thereon. Accordingly, the erosion may enable a refinement in which known foreground or background pixels are identified and noise or unwanted pixels are removed. The dilation may also enable a refinement in which the image that has been eroded is replaced into an original form or size with removal of unwanted aspects. For example, the erosion may remove a 3×3 pixel range while the dilation may increase a 3×3 pixel range to filter unwanted aspects in the captured image for background and foreground identification purposes.

The mask generated through using the further learning phase including thresholding and morphology may be used to update a continuous average of a background image across a predetermined number of frames such as N frames that is sampled at predetermined intervals such as S frames/second. Both of the predetermined number of frames and predetermined interval may be variables based on the content regarding the captured image and may be finely tuned to provide the best results such as varying the variables accordingly (e.g., averaging 1 frame/second across 10 seconds may potentially yield better results than 10 frames/second across 1 second). The results may be an image that is a representation of the background of the video. In this exemplary embodiment, the image may be substantially similar to the reference image as used in the background modeling mechanism. Once the entirety of the field of view required for the captured image has had an averaged background generated, the learning phase may be completed. Furthermore, as updates are made across N frames, it is possible for the user to manually improve the mask for the background and foreground through a variety of methods. For example, a user may simply designate areas as background regardless of chroma-key values determined for the area while in the learning phase.

The segmentation module 140 may therefore generate an accurate representation of the background of the captured images in the video. An accurate foreground mask and a background mask may be generated as well. For example, a subtraction combined with thresholding and morphology may result in the masks where a current frame subtracting the background results in the foreground. The exemplary embodiments may also utilize the mask in improving the process of creating a subsequent mask or for other purposes.

In a first example of using a previously generated mask, the mask may be provided into settings of the segmentation module 140 to improve accuracy and account for changes in the background over time. This may be performed using an "AND" operation across a mask generated in a final segmentation procedure and a mask generated by an initial chroma-key functionality. The result may be a mask based upon segmentation across which a background subtraction and the chroma-key functionality have agreeing values. Thresholding and morphology may again be applied to maximize a confidence that the mask is providing exclusively background regions. Accordingly, the points initially taken in the first learning stage may be tested whether they fall within the background mask. If determined to be so, the values may be updated with the latest chroma information. Furthermore, additional suggested points of background may be added to the list of chroma points. This new updated matrix of chroma locations and values may then be fed back into the chroma-key settings for improved accuracy.

In a second example of using a previously generated mask, the mask may also be used to improve a chroma mask prior to updating an average background. The segmentation module 140 may combine the masks in such a way that areas best suited for chroma may be updated by the chroma mask, while the subtraction mask may be used in regions where chroma is insufficient for segmentation. Additional methods may also be used such as a weighted average of the mask.

It should be noted that the above noted further-processing and further procedures described with reference to the background modeling mechanism may also be incorporated or adapted for use with the feature-based segmentation mechanism performed by the segmentation module 140. That is, the feature-based segmentation mechanism may also be improved through these further processing/procedures such that the manner in which foreground and background components are identified and utilized in the image analysis are improved.

It should also be noted that the above description may relate to when a background determined from the first approach is bolstered through information of the second approach. That is, a positive feedback from the second approach may verify what is and is not background/foreground as determined from the first approach. However, there may be instances when the values from the second approach may differ from the first approach. For example, a pixel that may have been determined to be background from the first approach may be determined to be foreground from the second approach. The exemplary embodiments may be configured to address such a scenario in a variety of ways. In a first example, the exemplary embodiments may utilize information from the first approach when a disparity is detected between the two approaches. In a second example, the exemplary embodiments may determine which of the approaches have a higher probability of accurately detecting background/foreground at the instance that the disparity is detected and utilize the corresponding approach.

The above therefore describes examples of the image analysis mechanisms that may be utilized by the electronic device 100. Specifically, the first image analysis mechanism may be the background modeling mechanism performed by the modeling module 135 and the second image analysis mechanism may be the feature-based segmentation mechanism performed by the segmentation module 140. Various different types of procedures in performing the different mechanisms may be used as well as modifications and adaptations may be incorporated into these mechanisms. As noted above, a second aspect of the exemplary embodiments is the manner in which the image analysis mechanisms are utilized in the image analysis procedure. As will be described below, the exemplary embodiments may therefore selectively utilize the mechanisms and incorporate features of all the mechanisms in determining a foreground and a background of a scene captured in images.

In a first portion of the image analysis procedure, the electronic device 100 may select which of the image analysis mechanisms to use. Specifically, the selection module 145 of the processor 105 of the electronic device 100 may provide this functionality. As noted above, the selection module 145 may be configured to select which of the first and second image analysis mechanisms to use as a primary mechanism in determining the background and the foreground in the captured image. In performing this functionality, the selection module 145 may receive information regarding the images that are being captured. For example, the selection module 145 may receive or determine parameters related to the image-capturing devices that are capturing the images. As discussed above, different image analysis mechanisms may be more effective for select conditions of image capturing, such as whether the image-capturing device is static or moving, whether the image-capturing device is zooming in or out, etc. Thus, the selection module 145 may receive an indication or information regarding the disposition of the image-capturing devices. The selection module 145 may also receive further information of the parameters in which the image-capturing devices are operating as well as environmental information, object information, etc. Through consideration of these factors, the selection module 145 may properly determine which of the image analysis mechanisms to utilize.

The selection module 145 may utilize a stored database of settings that indicate the preferred image analysis mechanism. For example, the database may be stored in the memory arrangement 110. The database may be generated based upon information that is empirical, statistical, etc. Although the database may be pre-generated for use by the selection module 145, it should be noted that the selection module 145 may update the database as well. For example, a newer version of the database may be available and retrieved via the transceiver 125. In another example, the selection module 145 may update the database based upon trials and other image analyses that are performed by the electronic device 100. Thus, based upon the various inputs of the available information of the image-capturing devices, the selection module 145 may determine the appropriate image analysis mechanism. For example, as discussed above, when the image-capturing devices are static, the background modeling mechanism may be more effective. When the image-capturing devices are moving, the feature-based segmentation mechanism may be more effective. In this manner, the exemplary embodiments may selectively and dynamically perform an image analysis for foreground and background determination for captured images based upon this available information. It should be noted that the exemplary embodiments may provide this functionality separately and independently of any further operations that may or may not be performed.

In a more detailed implementation of the first portion of the image analysis procedure, the exemplary embodiments may perform a plurality of steps to accomplish this functionality. An image-capturing device such as a camera that covers activities of interest may tend to alternate between a dynamic pose (e.g., moving) when tracking event progression to a static pose when the event stabilizes into a general area within a field of view of the image-capturing device. The current motion pattern of the image-capturing device may be inferred from calibration data of the image-capturing device or based on an analysis of its captured video images. The selection module 145 may utilize this information in determining which of the image analysis mechanisms to utilize.

As discussed above, the background modeling mechanism may be most suited to be employed on images captured by a stationary image-capturing device. In contrast, when the image-capturing device is moving (or even vibrating), the feature-based segmentation mechanism may be the preferred approach for extracting the foreground from the captured images. The two methods are complementary to each other since the background modeling mechanism mainly utilizes temporal information (inter-frame processing) while the feature-based segmentation mechanism mainly utilizes spatial information (intra-frame processing). However, both mechanisms require ad hoc (e.g., on-the-fly) maintenance or adaptation as the scene appearance may be changing over time.

As discussed above, the selection module 145 may determine a disposition or movement based upon, for example, calibration data generated internally or externally to the electronic device 100. In the selection of an image analysis mechanism, the determination that the image-capturing device is moving may indicate that the segmentation module 140 is to be selected for the feature-based segmentation mechanism to be performed. Whereas, a determination that the image-capturing device is static may indicate that the modeling module 135 is to be selected for the background modeling mechanism to be performed.

When the image-capturing device is moving, the feature-based segmentation mechanism may be used using, for example, clustering methods operating mainly on spatial features such as color, texture, shape, optical flow, disparity, etc. to partition the image into segments. Each segment may correspond to a separate object or surface in the scene of the captured image. Each segment may be keyed to be either a part of the background or a part of the foreground. When the feature-based segmentation utilizes a chroma-key functionality, a keying may be performed based on information stored in a look-up-table (LUT). As discussed above, the chroma-key functionality may receive inputs from a user such that during a system setup, the user identifies several regions in the scene (e.g., throughout a field) representative of the background (or the foreground). These regions and their image statistics (e.g., mean colors and standard deviations) may be recorded in the LUT. Information in the LUT may then be utilized to drive a keying during runtime. It should be noted that the LUT may also be updated using various procedures including the background modeling mechanism (as will be described in further detail below).

When the image-capturing device is static, the background modeling mechanism may be used. As discussed above, the captured images while the image-capturing device is static may be used to generate a reference image of only the background such that a subsequent image may be compared to the reference image to determine foreground objects.

In a second portion of the image analysis procedure, the electronic device 100 may utilize more than one image analysis mechanism where one image analysis mechanism may provide a primary mode and another image analysis mechanism may provide a secondary mode. Specifically, the feedback module 150 of the processor 105 of the electronic device 100 may provide this functionality. As noted above, the feedback module 150 may be configured to incorporate analysis from the first image analysis mechanism into the second image analysis mechanism, and vice versa, such that the selected image analysis mechanism provides the primary mechanism and the other provides a secondary mechanism. In performing this functionality, the feedback module 150 may incorporate features of the secondary mechanism into the primary mechanism.

In a first example, the feedback module 150 may utilize the primary mechanism and the secondary mechanism in a substantially parallel manner. Again, the primary and secondary mechanisms may be determined by the selection module 145. Once the selection module 145 has made this determination, the parallel executions of the image analysis mechanisms may provide improvements to confidence in pixel evaluation. For example, if the image-capturing device is moving, the primary mechanism may be the feature-based segmentation mechanism and the secondary mechanism may be the background modeling mechanism. The primary mechanism may indicate that a specific pixel in the captured image corresponds to background. The secondary mechanism may also indicate that the specific pixel in the same captured image also corresponds to background. With this additional information, the feedback module 150 may enable foreground and background masks that are more accurate. When the primary and secondary mechanisms disagree with one another, the feedback module 150 may be configured to perform a subsequent operation such as utilizing the determination of the primary mechanism, performing additional procedures to verify the determination of the primary or secondary mechanism, etc.

In a second example, the feedback module 150 may utilize the primary mechanism and the secondary mechanism in a serial manner or utilize information generated by the secondary mechanism as needed. In a particular embodiment, the feedback module 150 may determine a change in the parameters of the image-capturing device that indicate when a change to the other of the image analysis mechanism may be preferred. For example, the selection module 145 may have determined that the image-capturing device is moving, and therefore selected the feature-based segmentation mechanism as the primary mechanism. The feedback module 150 may subsequently determine if the image-capturing device pauses or becomes static. While static, the feedback module 150 may indicate to the modeling module 135 to begin building a background model or reference image. This may enable each pixel to be evaluated across time and select a most probable value as the background value. This may assume that foregrounds are transient (e.g., most of the time, each pixel's value is a projection of a three-dimensional background point). Thus, it may take a certain amount of time (e.g., a significant number of frames) to identify a most frequency value for each pixel. To expedite this process, a last keying result from performing the feature-based segmentation mechanism while the image-capturing device was moving may be used to initialize the background model. Thus, these processes may be used during a short time after the image-capturing device has stopped moving. In addition, spatial information derived from a segmented image using the feature-based segmentation may be used to improve the background model by, for example, excluding non-background pixel values from contaminating the statistics of the pixel's background model. In this manner, the feedback module 150 may incorporate the primary and secondary mechanisms as required to improve the generation of the foreground and background masks for captured images.

It is noted that the background model or reference image generated by the background modeling mechanism may rely on temporal information accumulated for each pixel captured during the static image-capturing phase. The pixel-wise statistics may be used to update the global statistics recorded in the LUT described above from performing the feature-based segmentation mechanism. Again, the LUT includes representative background regions from the scene and the associated statistics. Since the appearances of the regions may change over time, the background model may then be used to update the statistics of the regions as well as adjusting the LUT by adding/deleting regions and the corresponding statistics.

Figure 2:
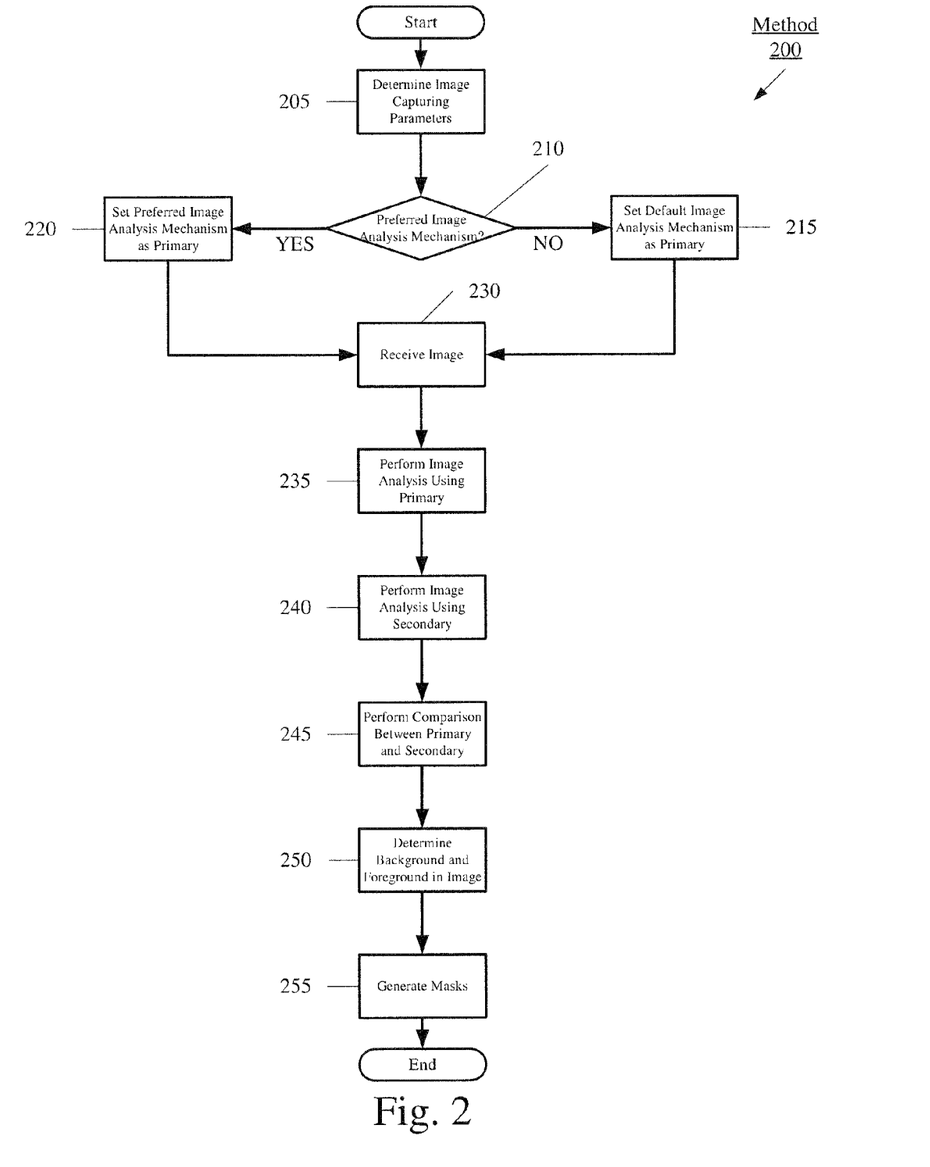
FIG. 2 shows a method of processing an image according to the exemplary embodiments.

FIG. 2 shows a method 200 of processing an image according to the exemplary embodiments. The method 200 relates to initially performing the first portion of the image analysis procedure in which an image analysis mechanism such as the background modeling mechanism and the feature-based mechanism is selected. The method 200 also relates to performing the second portion of the image analysis procedure in which a further image analysis mechanism or information therefrom may be incorporated with the original image analysis mechanism. The method 200 will be described with regard to the electronic device 100 of FIG. 1.

In step 205, the electronic device 100 may determine or receive the parameters or information regarding the image-capturing device or the manner in which the images are captured. For example, the selection module 145 may receive the parameters/information. As described herein, the parameters may relate to whether the image-capturing device is static or moving. However, it should again be noted that the use of the disposition (or movement) of the image-capturing device is only exemplary and this parameter may be representative of any consideration or basis upon which different image analysis mechanisms may be selected.

In step 210, the electronic device 100 may determine a preferred image analysis mechanism to use under the parameters/information of the image-capturing device. For example, the selection module 145 may perform this functionality. As discussed above, the electronic device 100 may have a stored database indicating various conditions or parameters related to the image capture and indicates a corresponding image analysis mechanism that is preferable under the given image capture conditions. For example, when the image-capturing device is static, the preferred image analysis mechanism may be the background modeling mechanism while when the image-capturing device is moving, the preferred image analysis mechanism may be the feature-based segmentation mechanism. If there is no preference (e.g., both approaches are determined to be equally effective), the electronic device 100 continues the method 200 to step 215 where a default image analysis mechanism is set as the primary mechanism. The predetermination of what is the default image analysis mechanism may be provided initially by a user or administrator or may have been preset.

If the electronic device 100 determines that the conditions are indicative of a preferred image analysis mechanism, the electronic device 100 continues the method to step 220. In step 220, the electronic device 100 sets the preferred image analysis mechanism as the primary mechanism.

In step 230, the electronic device 230 may receive the captured image(s). As discussed above, the electronic device 100 may receive captured images from further components such as image-capturing devices via the transceiver 125. The electronic device 100 may also be configured with components (e.g., other components 130) that enable the image-capturing functionality to be performed by the electronic device 100.

In step 235, the electronic device 100 may perform the image analysis procedure using the primary mechanism. For example, as discussed above, the primary mechanism may be the feature-based segmentation mechanism when the image-capturing device is determined to be moving. Accordingly, the selection module 145 may determine that the segmentation module 140 may be used to perform the feature-based segmentation mechanism as described in detail above.

In step 240, the electronic device 100 may perform the image analysis procedure using the secondary mechanism. The secondary mechanism may be the background modeling mechanism since the primary mechanism is the feature-based segmentation mechanism. As discussed above, the performance of the secondary mechanism may be utilized in a variety of manners. For example, the secondary mechanism may be executed in parallel to the first mechanism. In another example, the secondary mechanism may be executed upon a trigger or other indication (e.g., determining that the image-capturing device is no longer moving and is static).

In step 245, the electronic device 100 may perform a comparison between the primary and secondary mechanisms. For example, when performed in parallel, each mechanism may determine foreground and background pixels and a consensus or overlap of a pixel as foreground or background may improve accuracy of the determination. In another example, information provided through one mechanism may be used as a basis or comparison basis in performing the other mechanism. Thus, in step 250, the electronic device 100 may determine what is background and what is foreground in the captured image such that in step 255, the electronic device 100 may generate the respective masks.

The exemplary embodiments provide a device and method for image analysis in determining background and foreground objects in a captured image. Specifically, the exemplary embodiments provide a first portion of an image analysis procedure that enables one of a plurality of image analysis mechanisms to be selected based upon factors or conditions of the manner in which the images are captured. The exemplary embodiments provide a second portion of the image analysis procedure that enables a further one of the image analysis mechanisms to be incorporated into the process to improve the accuracy and performance of the image analysis procedure.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
    at an electronic device,
        receiving information corresponding to an image-capturing device that is capturing an image;
        automatically selecting one of a plurality of image analysis mechanisms based upon the information;
        receiving the captured image captured by the image-capturing device;
        performing an image analysis using the selected image analysis mechanism on the captured image to determine a foreground and a background in the captured image;
        selecting a further one of the image analysis mechanisms;
        determining secondary information generated by using the further image analysis mechanism; and
        incorporating the secondary information into determining the foreground and the background in the captured image.

2. The method of claim 1, wherein the information is disposition information indicating whether the image-capturing device is static or dynamic when capturing the captured image.

3. The method of claim 2, wherein the image analysis mechanisms include a background modeling mechanism that is selected when the disposition information indicates the image-capturing device is static when capturing the captured image.

4. The method of claim 2, wherein the image analysis mechanisms include a feature-based segmentation mechanism that is selected when the disposition information indicates the image-capturing device is dynamic when capturing the captured image.

5. The method of claim 1, further comprising:
    determining a further foreground and a further background in the captured image using the further image analysis mechanism; and
    comparing the foreground with the further foreground and the background with the further background.

6. The method of claim 5, further comprising:
    performing the further image analysis mechanism using primary information generated from performing the selected image analysis mechanism.

7. The method of claim 1, wherein the further image analysis mechanism is used based upon a predetermined condition, wherein the predetermined condition is a change in a disposition of the image-capturing device.

8. The method of claim 1, further comprising:
    generating at least one of a foreground mask and a background mask based upon the foreground and the background in the captured image.

9. The method of claim 1, wherein the image-capturing device is internal to the electronic device.

10. An electronic device, comprising:
    a memory configured to store a captured image generated by an image-capturing device; and
    a processor receiving information corresponding to the image-capturing device, the processor automatically selecting one of a plurality of image analysis mechanisms based upon the information, the processor performing an image analysis using the selected image analysis mechanism on the captured image to determine a foreground and a background in the captured image,
        wherein the processor further selects a further one of the image analysis mechanisms, determines secondary information generated by using the further image analysis mechanism, and incorporates the secondary information into determining the foreground and the background in the captured image.

11. The electronic device of claim 10, wherein the information is disposition information indicating whether the image-capturing device is static or dynamic when capturing the captured image.

12. The electronic device of claim 11, wherein the image analysis mechanisms include a background modeling mechanism that is selected by the processor when the disposition information indicates the image-capturing device is static when capturing the captured image.

13. The electronic device of claim 11, wherein the image analysis mechanisms include a feature-based segmentation mechanism that is selected by the processor when the disposition information indicates the image-capturing device is dynamic when capturing the captured image.

14. The electronic device of claim 10, wherein the processor further determines a further foreground and a further background in the captured image using the further image analysis mechanism and compares the foreground with the further foreground and the background with the further background.

15. The electronic device of claim 14, wherein the processor further performs the further image analysis mechanism using primary information generated from performing the selected image analysis mechanism.

16. The electronic device of claim 10, wherein the further image analysis mechanism is used based upon a predetermined condition, wherein the predetermined condition is a change in a disposition of the image-capturing device.

17. The electronic device of claim 10, wherein the processor further generates at least one of a foreground mask and a background mask based upon the foreground and the background in the captured image.

18. A non-transitory computer readable storage medium including a set of instructions executable by a processor, wherein the instructions, when executed, cause the processor to:
   receive information corresponding to an image-capturing device that is capturing an image;
   automatically selecting one of a plurality of image analysis mechanisms based upon the information;
   receiving the captured image captured by the image-capturing device;
   performing an image analysis using the selected image analysis mechanism on the captured image to determine a foreground and a background in the captured image,
   selecting a further one of the image analysis mechanisms;
   determining secondary information generated by using the further image analysis mechanism; and
   incorporating the secondary information into determining the foreground and the background in the captured image.

* * * * *